United States Patent [19]

Hill

[11] Patent Number: 5,497,419
[45] Date of Patent: Mar. 5, 1996

[54] METHOD AND APPARATUS FOR RECORDING SENSOR DATA

[75] Inventor: Brian R. Hill, Los Angeles, Calif.

[73] Assignee: Prima Facie, Inc., Conshohocken, Pa.

[21] Appl. No.: 229,602

[22] Filed: Apr. 19, 1994

[51] Int. Cl.⁶ ..................................................... H04L 9/00
[52] U.S. Cl. .................................. 380/9; 380/25; 380/30; 380/49
[58] Field of Search .................................. 380/9, 23–25, 380/30, 49

[56] References Cited

U.S. PATENT DOCUMENTS

| 4,980,913 | 12/1990 | Skret | 380/23 |
| 5,321,753 | 6/1994 | Gritton | 380/23 |
| 5,343,527 | 8/1994 | Moore | 380/25 |
| 5,361,326 | 11/1994 | Aparicio, IV et al. | 395/21 |

OTHER PUBLICATIONS

Bruce Schneier, "Untangling Public–Key Cryptography", Dr. Dobb's Journal, May 1992, pp. 16–28.
Bruce Schneier, "The Cambridge Algorithms Workshop", Dr. Dobb's Journal, Apr. 1994, pp. 18–24.
Bruce Schneier, "The Blowfish Encryption Algorithm", Dr. Dobb's Journal, Apr. 1994, pp. 38–40.
Bruce Schneier, "RSA Data Security Conference", Dr. Dobb's Journal, Apr. 1994, pp. 3–6.
Peter Smith, "LUC Public–key Encryption", Dr. Dobb's Journal, Jan. 1993, pp. 44–49.
Tim Victor, "Hands On From Digits to Disc", CD–ROM Today, pp. 24–29.
Don Clark, "Norris Plans to Launch Digital Recorder Using Flash Memory Chips From Intel", The Wall Street Journal, Mar. 28, 1994.

Primary Examiner—Salvatore Cangialosi
Attorney, Agent, or Firm—Robert M. Storwick

[57] ABSTRACT

A method and apparatus for recording sensor data. The analog and digital signals containing the sensor data are accompanied by a concurrent analog video signal. The analog signals are converted to digital form and highly redundant signals are compressed according to conventional compression techniques. The resulting compressed and uncompressed signals are encrypted and stored on a removable hard disk. The data stored on the removable hard disk can later be played back to reconstruct the original signals while assuring that the played back signals are correct reconstructions of the original signals.

24 Claims, 4 Drawing Sheets

METHOD AND APPARATUS FOR RECORDING SENSOR DATA

TECHNICAL FIELD

The present invention relates to methods and apparatus for recording and, more particularly, to methods and apparatus for recording sensor data with video signals.

BACKGROUND OF THE INVENTION

Motor vehicles are an integral part of modern societies. Beside providing the facility of transporting goods in the market place, they also transport millions of people on a daily basis and are used to provide services, such as public safety services. The burgeoning use of motor vehicles has given rise to a complex and expensive liability system concerning vehicular transportation. In nearly all states of the United States, for example, automobile insurance is required. Accordingly, much expensive litigation ensues in connection with motor vehicle accidents and other incidents.

The massive system of policies and claims that result from the insurance coverage and related litigation are subject to fraudulent abuse. Current estimates indicate that this phenomenon is on the rise, causing increased cost to the system, even in locales where accident rates are diminishing. In addition to fraud, the resolution of claims relating to motor vehicles is an inefficient time-consuming process that experiences additional costs by relying heavily on a tort-based legal process. As one measure of the increased burden that this phenomenon puts on society, legal costs concerning automotive injury claims is increasing significantly.

One problem related to these increased costs is the difficulty in providing basic documented facts concerning motor vehicle incidents. Beside the abuse of the process allowed by parties bringing suit in the hopes of an out-of-court settlement, costs are often significantly greater when a motor vehicle-related suit does end up in court. To combat these problems of documentation and out-of-control costs, many insurance companies and states in the United States are considering implementation of mandatory vehicle inspections and special investigation personnel units. However, these approaches are expensive, too, and this expense adds to the overall costs of the transportation system.

One approach to helping curtail these costs is to provide better data concerning motor vehicle incidents. This will help to curtail fraudulent claims. While other vehicle-borne systems have been proposed to provide information concerning automotive accidents, these systems are themselves subject to fraudulent manipulation. As one results, courts of law are not likely to give much evidential weight to such information systems unless they are secure.

Accordingly, it is desirable to have a vehicle-borne data collection system which is capable of securely recording data concerning accidents. Of course, such systems will have other applications, such as other means of transportation and other situations demanding secure preservation of data concerning events, such as bank security systems.

SUMMARY OF THE INVENTION

According to one aspect, the invention is a method for recording sensor data with a video signal to protect the sensor data. The sensor data is contained in signals from one or more sensors. The method comprises the steps of a) encrypting the signals from the one or more sensors, b) combining the video signal and the encrypted signals to produce an output signal, and c) recording the output signal on a recording medium.

According to another aspect, the invention is a method for retrieving sensor data originally produced by one or more sensors. The sensor data is encrypted with a video signal to produce a recorded signal that protects the sensor data and being contained in signals from one or more sensors. The method comprises the steps of a) playing back the recorded signal to produce a played-back signal, b) decrypting the played-back signal to produce a video signal and one or more sensor signals containing data originally produced by one or more sensors, and c) processing the one or more sensor signals to produce the sensor data.

According to another aspect, the invention is a method for recording sensor data with a video signal to protect the sensor data. The sensor data is contained in signals from one or more sensors. The method comprises the steps of a) compressing the video signal to produce a compressed video signal, b) combining the compressed video signal and the signals from the one or more sensors to produce a digital signal, c) encrypting the digital signal to produce an output signal, and d) recording the output signal on a recording medium.

According to yet another aspect, the invention is a method for retrieving sensor data originally produced by one or more sensors. The sensor data is encrypted with a video signal to produce a recorded signal that protects the sensor data and being contained in signals from one or more sensors, at least one of the sensors producing an analog signal. The method comprises the steps of a) playing back the recorded signals to produce a played-back signal, b) decrypting the played-back signal to produce a video signals and one or more sensor signals containing data originally produced by one or more sensors, c) determining whether any of the one or more sensor signals are digital signals, and d) processing the one or more sensor signals to produce the sensor data, including converting the one or more sensor signals to produce a corresponding analog signal.

According to a still further aspect, the invention is a method for recording sensor data with a video signal to protect the sensor data. The sensor data is contained in signals from one or more sensors. The method comprises the steps of a) determining which of the signals from the one or more sensors are analog sensor signals and which of the signals from the one or more sensors are digital sensor signals, b) converting the data in the analog sensor signals to one or more first digital signals, c) encrypting the digital sensor signals and the one or more first digital signals to produce second digital signals, d) converting the second digital signals to first analog signals, and e) recording the video signal and the first analog signals on a recording medium.

According to yet another aspect, the invention is an apparatus for recording sensor data with a video signal to protect the sensor data. The sensor data is contained in signals from one or more sensors. The apparatus comprises an encryption circuit, a signal processing circuit and a recorder. The encryption circuit encrypts the signals from the one or more sensors. The signal processing circuit combines the video signal and the encrypted signals to produce an output signal, and the recorder records the output signal on a recording medium.

According to yet another aspect, the invention is an apparatus for recording sensor data with a video signal to protect the sensor data. The sensor data is contained in signals from one or more sensors. The apparatus comprises a compressions circuit, a signal processing circuit, an encryption circuit and a recorder. The compression circuit compresses the video signal. The signal processing circuit combines the compressed video signal and the signals from the one or more sensors and produces a digital signal therefrom. The encryption circuit encrypts the digital signal and produces an output signal therefrom. The recorder records the output signal on a recording medium.

According to an even further aspect, the invention is an apparatus for recording sensor data with a video signal to protect the sensor data. The sensor data is contained in signals from one or more sensors. The apparatus comprises a distinction circuit, a first conversion circuit, an encryption circuit, a second conversion circuit, and a recorder. The distinction circuit determines which of the signals from the one or more sensors are analog sensor signals and which of the signals from the one or more sensors are digital sensor signals. The first conversion circuit converts the data in the analog sensor signals to one or more first digital signals. The encryption circuit encrypts the digital sensor signals and the one or more first digital signals to produce second digital signals. The second conversion circuit convert the second digital signals to first analog signals, and the recorder records the video signal and the first analog signals on a recording medium.

According to even still another aspect, the invention is an apparatus for recording sensor data with a video signal to protect the sensor data. The sensor data is contained in signals from one or more sensors. The apparatus comprises means for encrypting, means for combining and means for recording. The means for encrypting encrypts the signals from the one or more sensors. The means for combining combines the video signal and the encrypted signals to produce an output signal. The means for recording records the output signal on a recording medium.

According to another aspect, the invention is a method for retrieving sensor data originally produced by one or more sensors, the sensor data being encrypted with a video signal to produce a recorded signal that protects the sensor data and being contained in signals from one or more sensors, at least one of the sensors producing an analog signal. The method comprises the steps of a) playing back the recorded signals to produce a played-back signal, b) decrypting the played-back signal to produce a video signals and one or more sensor signals containing data originally produced by one or more sensors, c) determining whether any of the one or more sensor signals are digital signals, and d) processing the one or more sensor signals to produce the sensor data, including converting the one or more sensor signals to produce a corresponding analog signal.

According to and even still further aspect, the invention is an apparatus for recording sensor data with a video signal to protect the sensor data. The sensor data is contained in signals from one or more sensors. The apparatus comprises means for compress, means for combining, means for encrypting and means for recording. The means for compressing compresses the video signal to produce a compressed video signal. The means for combining combines the compressed video signal and the signals from the one or more sensors to produce a digital signal. The means for encrypting encrypts the digital signal to produce an output signal, and the means for recording records the output signal on a recording medium.

In still yet another aspect, the invention is an apparatus for recording sensor data with a video signal to protect the sensor data. The sensor data is contained in signals from one or more sensors. The apparatus comprises means for determining, first and second means for converting, means for encrypting, and means for recording. The means for determining determines which of the signals from the one or more sensors are analog sensor signals and which of the signals from the one or more sensors are digital sensor signals. The first means for converting converts the data in the analog sensor signals to one or more first digital signals. The means for encrypting encrypts the digital sensor signals and the one or more first digital signals to produce second digital signals. The second means for converting converts the second digital signals to first analog signals, and the means for recording records the video signal and the first analog signals on a recording medium.

DETAILED DESCRIPTION OF THE INVENTION

Figure 1:
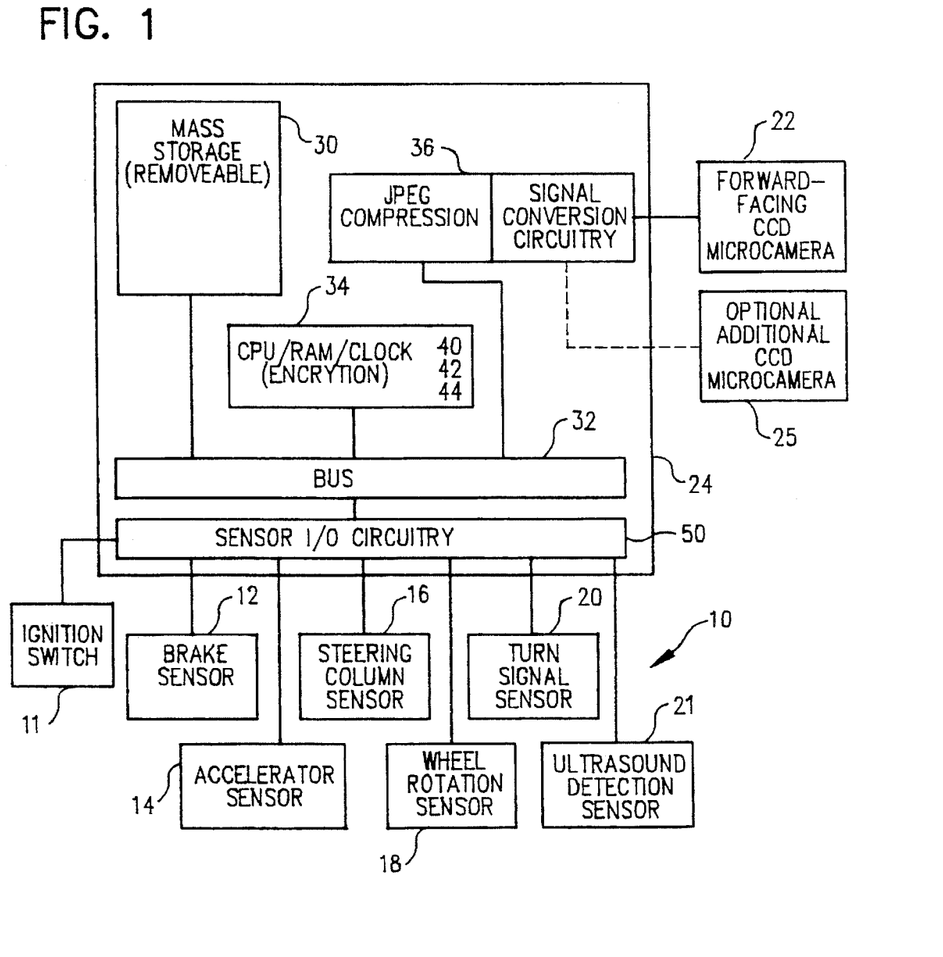
FIG. 1 is a schematic diagram of a first preferred embodiment of an apparatus of the invention.

FIG. 1 is a schematic diagram of a preferred embodiment of an apparatus of the invention. The sensor data recorder 10 can be adapted for placement at or near the location where the sensors are located. In the following detailed description, it will be assumed that the data recorder 10 is located in an automobile (not shown). Within the automobile, the data recorder 10 can be placed in a passenger compartment or, for greater security, can be placed in a more secure place such as a trunk. Of course, those skilled in the art would provide appropriate protection for the data recorder 10, depending upon the particular task to which the data recorder 10 is applied. For example, a data recorder 10 that is to be installed in an automobile should probably be shielded from accelerations due to impacts, as well as temperature extremes and high humidity. Other applications will obviously have their own particular environmental factors to be considered in the installation.

In the preferred embodiment, the data recorder 10 includes a number of sensors, such as ignition switch 11, brake sensor 12, accelerator sensor 14, steering column sensor 16, wheel rotation sensor 18, turn signal sensor 20 and ultrasound detection sensor 21. The data recorder 10 also includes a source of video information such as a forward-facing charge-coupled device (CCD) microcamera 22 and a recorder 24. The data recorder 10 may also include one or more optionally additional CCD microcameras, such as CCD microcamera 25 that can be pointed rearward.

The CCD microcamera 22 can be a conventional camera mounted on a universal mount. Appropriate specifications are that the CCD microcamera 22 should be operable in an operating temperature range from −10 Celsius to +60 Celsius and to a maximum relative humidity of 95%. Further, the CCD microcamera 22 should have automatic shutter sensitivity ranging from 1/60 to 1/32000 second and a resolution of at least 380 by 380 picture element (pixel) rows and columns. In addition, the CCD microcamera 22 should have an illumination sensitivity of 1 lux or less.

In some embodiments, it may be desirable to place the CCD microcamera 22 on a pan/tilt mount in a weatherproof enclosure. The CCD microcamera 22 could then be mounted outside of a vehicle and equipped with radio, infrared or ultrasound beacon-following sensors. Implementation of such sensors are well within the skills of those of the relevant electronic arts. Such beacon-following systems can be used to follow and provide video images of a person carrying an appropriate beacon source. An important example is a microcamera adapted to follow public safety personnel who are wearing a beacon and whose motions and surroundings can then be automatically recorded in video form. Further, if a radio or infrared beacon is used, such a system could also provide an audio signal from the vicinity of the person wearing the beacon. The audio signal could carry the voice of the person wearing the beacon, and could be compressed, encrypted and recorded with the data from the other sensors, as will be described below.

The recorder 24 can be a conventional JVC time lapse cassette recorder, although other recorders could also be used.

The sensors 11, 12, 14, 16, 18, 20 and 21, and the CCD microcamera 22 (and CCD microcamera 25, if included) are connected to the recorder 24.

The various sensors 11, 12, 14, 16, 18, 20 and 21 may include a local transducer at the location of the variable being sensed and a remote transducer placed more closely to the recorder 24 than the location of the variable being sensed. For example, the wheel rotation sensor 18 may include a local transducer that transforms some of the rotational energy into electrical energy and a remote transducer that converts the electrical energy into an electromagnetic signal that can be recorded by the recorder 24. The local transducer of the wheel rotation sensor 18 may be a segmented ferrous-based cog wheel that rotates with the wheel and the remote transducer can be a reluctance-sensing transducer that transforms the detected pulses in the magnetic field to an electrical signal that is processed for optimal use by the data recorder 10.

Similarly, the ultrasound detection sensor 21 can have forward- or side-located components that produce signals that are further processed at a remote location. In one embodiment, the ultrasound detection sensor 21 can include a plurality of ultrasonic transducers mounted at the front and around the sides of the vehicle. From those locations, transducers produce and/or receive ultrasonic signals to determine the immediate surroundings of the vehicle and produce signals that can be processed to produce an alarm signal that will activate the inventive data recorder 10 to record the proximity of other nearby vehicles. Depending upon the particular signal processing used, in one embodiment such an ultrasound detection sensor 21 can be used to monitor the driving habits or the vehicle's operator(s).

The recorder 24 shown in FIG. 1 is a hardware-based implementation of an embodiment of the invention. The recorder 24 includes a mass storage device 30, a bus 32, a signal processing circuit 34, a signal conversion circuit 36 and a sensor input/output (I/O) circuit 50. The mass storage device 30, the signal processing circuit 34, and the signal conversion circuit 36, and the sensors I/O circuit 50 are all connected to the bus 32. The mass storage device 30 can take several forms. In one preferred embodiment the mass storage device 30 is a magnetic tape recorder (specified above) that records on a magnetic tape included in a removable cassette. In other embodiments, the mass storage device 30 can be a solid-state flash memory card or other removable memory mediums that store data. Examples are 2.5 and 3.5 inch removable disk drives capable of storing at least 120 megabytes of data.

The signal processing circuit 34 includes a central processing unit (CPU) 40, a random access memory (RAM) 42 and a clock 44 that are connected together in conventional fashion. These connected components allow the CPU 40 to process sensor and other signals received from the bus 32 in accordance with clock signals produced by the clock 44 and to record the results of the signal processing operations in the RAM 42. The actual signal processing performed by the CPU 40 is dependent upon a program which is installed in the CPU 40 when the data recorder 10 is first turned on. Such programming is conventional to those skilled in the art of computer programming. Two aspects of the necessary programming are worthy of specific note, however. The first is that the CPU 40 is programmed to convert digital signals from one format to another. The second is that the CPU 40 is also programmed to encrypt the information in the signals. The actual encryption method can be any one of many available possibilities. The preferred form, however, is a public key encryption method chosen from the many known public key encryption methods.

The signal conversion circuit 36 is used to convert the video signal from the CCD microcamera(s) 22 (and 25). At a minimum, the signal conversion circuit 36 must convert the analog video signal to digital data. Further, the signal conversion circuit 36 can control the sequencing of the video signals if there is more than one microcamera. The signal conversion circuit 36 can include a multiplexer that controls which CCD microcamera is being recorded at a given time. As will be described below, the rate at which the video signals are switched can be made a function of the state of alarm of the recorder 10. Accordingly, the signal conversion circuit 36 can be made to respond to alarm signals produced by the signal processing circuit 34. Alternatively, the signal conversion circuit 36 can take video signals from all of the CCD microcameras in operation and produce a concurrently composite video signal, such as a split screen video signal. The signal conversion circuit 36 can also receive date and time signals from the signal processing circuit 34 and produce video representations of those date and time signals in the analog video signal before digitizing the video signal.

In addition, the signal conversion circuit 36 compresses the highly redundant video signals from the CCD microcamera 22 and produces therefrom a compressed digital signal that it transfers to the bus 32. The compression operation is performed by hardware in the signal conversion circuit 36. This hardware conventionally takes the form of an application-specific integrated circuit (ASIC) that performs JPEG compression. Alternatively, and in some applications, it may be preferable to perform compression of the video data through other hardware means, such as an ASIC that performs MPEG or other well-known compression techniques. Specifically, the compression portion of the conversion circuit 36 compresses data received from the CCD microcamera 22, as well as any of the optional additional CCD microcameras 25 that may be in use in the specific preferred embodiment that is suitable for a particular application.

In operation, the recorder 24 receives signals from the sensors 11, 12, 14, 16, 18, 20 and 21, through the sensor I/O circuit 50 and the bus 32. The recorder 24 also receives signals from the CCD microcamera 22 (and any possible optional additional microcameras 25) through the signal conversion circuit 36. The signal processing circuit 34 receives the sensor and digital video signals through the bus 32, processes the signals, and sends the resulting processed digital signals to the mass storage 30 for recording.

Since the data recorded in the mass storage is encrypted, its security during playback can be given a very high degree of assurance. If a party wished to alter the data recorded in the mass storage, the encryption system applied would have to be defeated and the recorded data recorded over with counterfeit data that make contextual sense. In general, it would be very difficult to do so. It would be impossible, even given the massive amount of computing power available today, to counterfeit the data that can be stored by the present invention if a time constraint is applied, even a time constraint measured in years.

In some applications, it may be desirable to omit the signal conversion circuit 36 and transfer the data from the CCD microcamera 22 directly to the bus 32. In other applications, it may be desirable to omit the encryption of the digital data received by the signal processing circuit 34.

As applied to one particular desired specific embodiment of the invention, the signals from the CCD microcamera 22 can be compressed by the compression circuit (such as a JPEG circuit). Then the compressed data, along with the sensor data can be mixed with clock data before encryption, so that the encrypted data includes contemporaneous recordings of the date and time (clock signal), the sensor positions (sensor data) and the visual scene (video data). If desired, the date and time information can be inserted into the visual scene (through conventional circuitry and processing, not shown).

Figure 2:
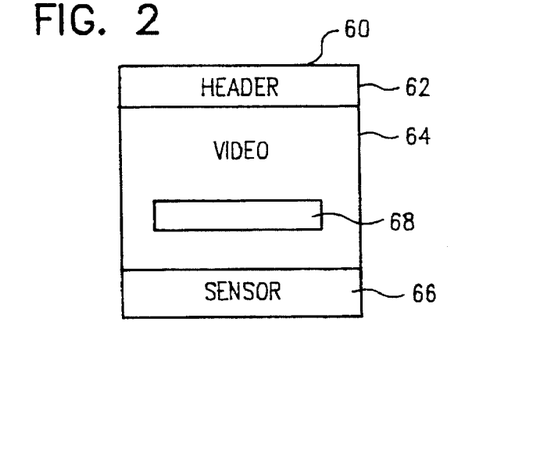
FIG. 2 is a schematic diagram of the structure of a data file, as stored by the preferred embodiments of the invention.

FIG. 2 is a schematic diagram of the structure of a data file, as stored by the preferred embodiment of the invention. The data file 60 is represented as a rectangular area containing digital data which are stored in a memory such as the RAM 42 of the signal processing circuit 34 in FIG. 1. However, the data have a format which is useful when reading and playing back the data. Specifically, the data file contains header data 62, video data 64 and sensor data 66, in that order. The header data 62 includes an indication of the file format that is used in the storage of the data in the file, the version of the recorder on which the data were recorded, a customer identification number, and additional portions reserved for future use. The video data 64 is 8-bit gray scale data, representing 256 different levels of gray. Alternatively, the video data 64 can represent a color video image. The video data 64 can be postprocessed, after the analog video signals have been digitized, by the insertion of a special digital data portion 68 that contains documentary data. Most often the documentary data will be the date and time at which the images in the video data were imaged by the microcamera(s) 22 and 25. However, the documentary data could be expanded to include digitized representations of the outputs of some or all of the sensors 11, 12, 14, 16, 18, 20 and 21.

While this procedure may document the video data 64, it can be useful to provide a first level of security to the video data by reserving specific pixels represented by the video data 64 which are used by the fonts of the characters used to represent the documentary data in the digital data portion 68. The font is chosen so that it is very difficult to reproduce if an attempt is made to modify the video data 64, but is very easy to verify as valid if no attempt to modify the video data 64 has been made.

The sensor data 66 includes digital representations of the value of the variable(s) for each of the sensors 11, 12, 14, 16, 18, 20 and 21. Typically, it is desirable to encode the digital sensor data 66 to discourage tampering. However, the primary security for the sensor and other data in the file format is provided by encryption that is applied after the data in the file are compressed.

There are further procedures to heighten the security of the data, particularly the video data 64 stored in the file format 60. One approach is to encode the gray scale (or color) information in the file format 60 so that consecutive digital values do not represent consecutive grays or colors. In this way, the data are represented in a false gray (or color) fashion that will discourage tampering.

Figure 3:
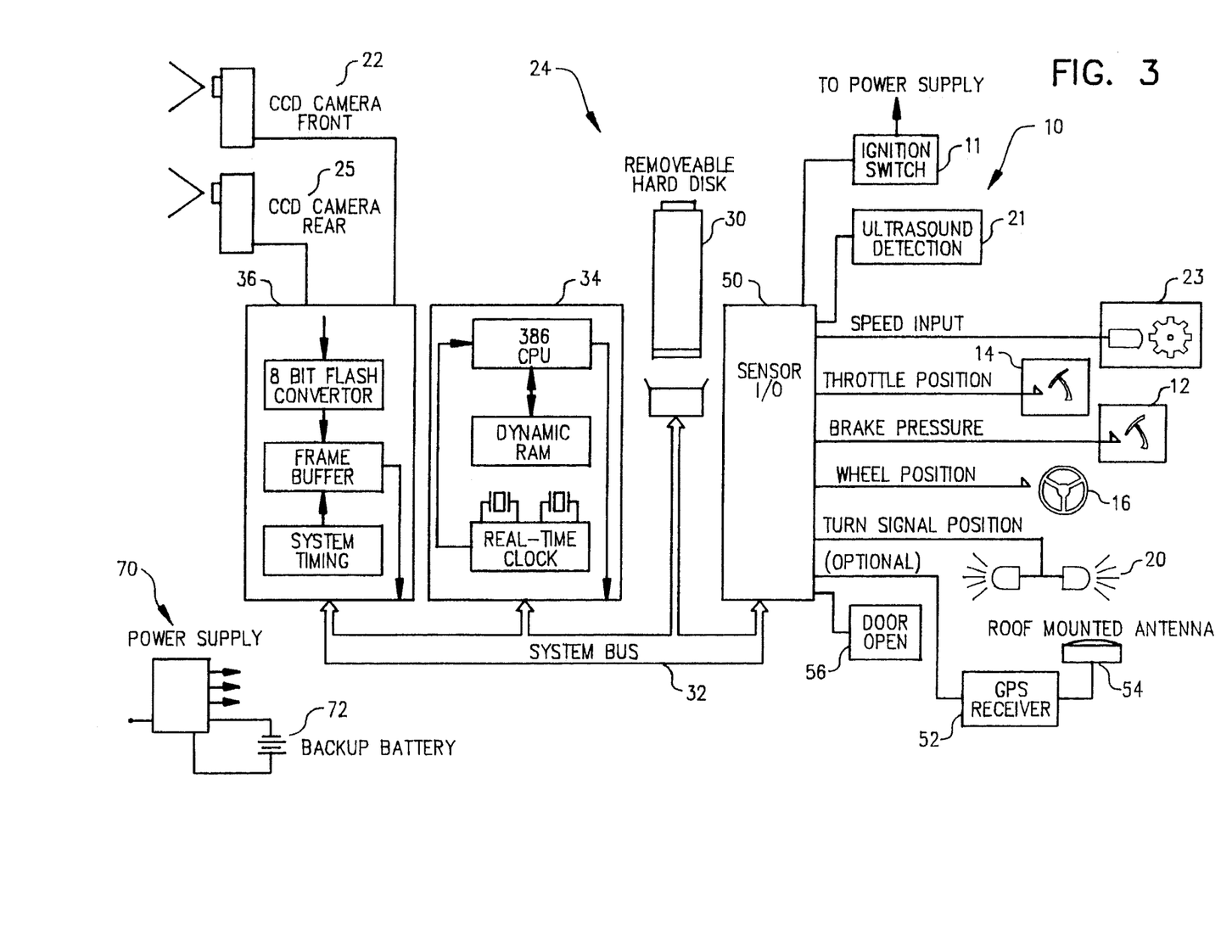
FIG. 3 is a schematic diagram of a second preferred embodiment of an apparatus of the invention.

FIG. 3 is a schematic diagram of a second preferred embodiment of an apparatus of the invention. The recorder 24 shown in FIG. 3 is a software-based implementation of an embodiment of the invention. In this schematic diagram, components which serve the same purpose as those described in FIG. 1 are given the same reference numerals as their counterparts in FIG. 1.

In FIG. 1, ignition switch sensor 11 may take the form of a conventional ignition switch that can be accessed so that it is possible to determine whether the ignition switch is turned on. Turning on the ignition is generally a good signal that the vehicle is about to be operated and may, in some system, signify that the data recording process should begin.. In addition, the brake sensor 12 may take the form of a brake pressure sensor, the accelerator sensor 14 may take the form of a throttle position sensor, and the steering column sensor 16 may take the form of a wheel position sensor.

The sensors can also include a speed input sensor 23 including a toothed wheel that rotates as the vehicle moves and produces pulsed signals in accordance with the rotational speed of the wheel. Another optional sensor is a Global Positioning Satellite receiver 52 which receives positional signals through its roof-mounted antenna 54 and produces sensor signals that are used by the sensor data recorder 10 to indicate the global location of the vehicle in which it is installed (within 30 meters). A further optional sensor is a door open sensor 56. The door open sensor 56 can be useful in identifying situations in which it is desirable to start recording data, even if the vehicle is not started. It can also be useful in identifying situations in which a public safety officer has left the vehicle, signifying that a beacon-following system controlling the pointing direction of the CCD microcamera(s) 22 and 25 should be activated.

The mass storage device 30 of the recorder 24 can be a removable hard disk having 500 megabytes of storage capacity. The recording time for the mass storage device is dependent upon the sampling rate of the signals which are to be stored.

The signal conversion circuit 36 is connected to one or both of the CCD microcameras 22 and 24 and includes flash converter circuitry to quickly transform the analog video signals from the microcameras to digital form. In this form, and in coordination with the signals produced by a system timing circuit, a frame buffer circuit produces framed digitized video data that are transferred to the bus 32 for transport to other hardware components of the data recorder 10, such as the signal processing circuit 34.

The signal processing circuit 34 includes a CPU, such as an Intel 80386 microprocessor, which is connected to a dynamic RAM and to a real-time clock in accordance with the good engineering practices well-known to those skilled in the electronics hardware arts. The data produced by the microprocessor are transmitted to the bus 32, which transfers them to the appropriate hardware component of the sensor data recorder 10, such as the mass storage device 30. In specific application, the microprocessor of the signal processing circuit 34 receives the data containing header, video and sensor data according to the file format 60 (see FIG. 2). As the data are received, the microprocessor applies a compression algorithm, such as the LWZ algorithm, to the received data and stores the data in compressed form in the dynamic RAM. The microprocessor then applies an encryption algorithm to the stored data and transfers the resulting encrypted and compressed data to the mass storage device 30 through the bus 32. In the mass storage device 30, the data are stored in a hard disk that is removable from the mass storage device 30. The removable hard disk containing the encrypted compressed data can be stored in a convenient location for later retrieval and replay of the data.

The power supply 70 of the data recorder 10 shown in FIG. 3 is an integral part of the data recorder. The power supply 70 is normally connected to the vehicle's battery. However, to protect the data recorder 10 from unexpected disruption and/or intended sabotage to the connection between the power supply 70 and the battery, the power supply 70 includes a backup battery 72. The backup battery 70 will supply power to the data recorder 10 in the event that the connection between the power supply 70 and the vehicle's battery is broken. In addition, the power supply 70 can be used to extend the time that the data recorder 10 can record data for a period of time after the automobile's ignition switch has been turned off.

Figures 4, 5:
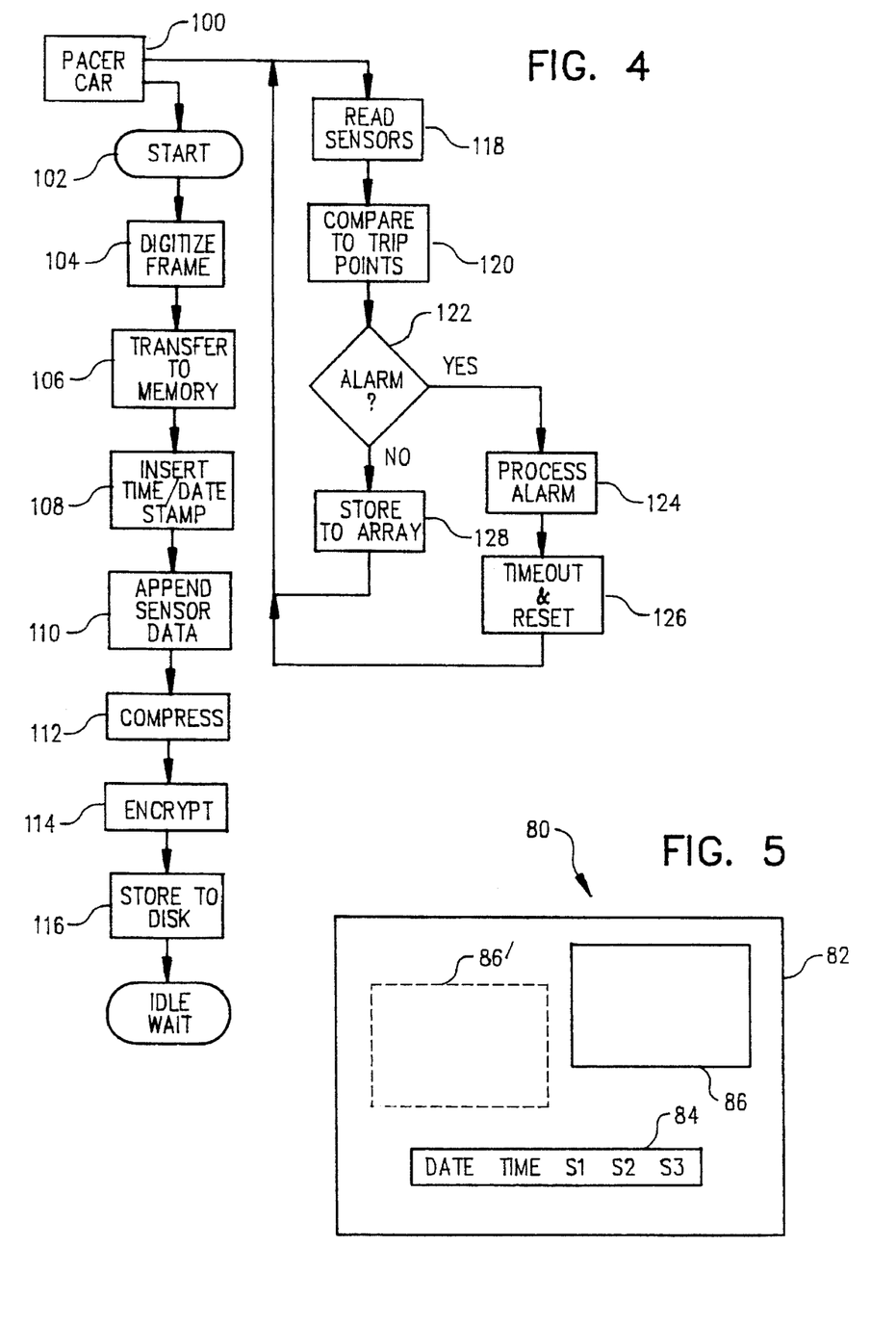
FIG. 4 is a flow chart of the program running within the preferred embodiments of the invention.
FIG. 5 is a representation of a video image, illustrating a method for controlling and assuring the integrity of the image upon processing, storage and playback.

FIG. 4 is a flow chart of the program running within the preferred embodiment of the invention shown in FIG. 1. The program is simultaneously accomplishing two tasks. One task is to receive and process data from the sensors. The other task is to receive and process data from the video camera(s) 22 (25) and to combine the video data with the sensor data. The combined data is then compressed, encrypted and stored to disk for later retrieval and replay in accordance with methods known in the prior art. The replay methods comprise the inverse steps to those described below in carrying out the encoding, encryption, compression and recording steps.

In accordance with signals produced by the system clock (block 100), the video data task starts (block 102) and digitizes a frame of video data produced by one or both of the microcameras (block 104). The system clock signals control when the readings from the sensors and the video camera(s) are taken. Typically, the sensor signals are sampled four times per second and the video camera data are sampled once per minute. However, the data can be sampled at different controllable rates as described below. The digitized video data is transferred to the dynamic RAM (block 106) and interspersed with time/date signals produced by the system clock, the time/date signals characterizing the time and date at which the signals are produced (block 108). The sensor data are also appended to the stored video and time/date signal data (block 110) in the file format described above, compressed (block 112), encrypted (block 114), and stored to disk (block 116) for later retrieval and replay. Then this task of the computer program awaits a further signal from the system clock, at which time it will begin again at block 102.

In the other task, the program reads the sensors when the appropriate signal is produced by the system clock (block 118). The sensor readings are taken frequently, allowing them to be processed digitally and/or statistically before they are made available as sensor data by the step represented by block 118. This program task then compares the sensor data to trip points or thresholds (block 120) and determines whether an alarm should be produced (block 122). In the alarm condition, when the CCD microcameras are normally inactive, they are activated to record the events that caused, and the sensor data that resulted from the alarm condition. However, if the CCD video microcameras are normally active, their signals may be sampled more frequently in the case of an alarm to increase the chance that the event prompting the alarm condition will be completely recorded. Examples of such trip points are a particular vehicle speed or a particular amount of steering wheel motion. In the first example, the step of block 120 can detect when the vehicle speed exceeds the trip point, and the step of block 122 can determine that an alarm should be produced. In the second example, the data recorder analyzes the magnitude and frequency of the steering motions to establish when the trip point has been exceeded.

If an alarm is to be produced, the alarm signal is processed (block 124), causing adjustment in the sampling rate, an alarm timeout and reset condition are established (block 126) and the program returns to block 118 to read the sensors again. To save storage space in the mass storage device 30, the alarm timeout is established to allow the system to collect possibly relevant data without requiring an undesirably large amount of the recording medium. The duration of the alarm timeout is a function of the reason for the alarm. For example, if the alarm is caused by the vehicle's speed exceeding a desired threshold, the data recorder 10 should be activated only as long as the speed is above the desired threshold. On the other hand, if the alarm is caused by erratic steering movements, the alarm condition should last beyond the time when the erratic steering movements cease.

If the alarm is not to be produced, the sensor data are stored in an array in memory (block 128) for use by the append sensor data step (represented by block 110) of the other task of the program, and the present task of the program returns to block 118 to read the sensors again.

FIG. 5 is a representation of a video image, illustrating a method for controlling and assuring the integrity of the image upon processing, storage and playback. In applications where compression of the entire video image would be impossible and yet the integrity of the video image 80 must be preserved (such as in a real-time recording and playback system), it is possible to sample and compress only a portion of the video signal from the CCD microcamera 22 and then to combine this signal with the signals from the various sensors 11, 12, 14, 16, 18, 20 and 21 before encrypting the resulting data. The video image 80 can include an image area 82 and generally an area 84 in which the date, time and status of various sensors (S1, S2 and S3) are displayed. In addition, both the entire video image 80 and a subportion 86 of the video image 80 are compressed.

The entire video image 80 need not be encrypted before storage, since the subportion 86 of the video image 80 is encrypted and preserved for decryption and comparison to the stored image 70 to assure that the stored image is valid. Instead the entire video image 80 is converted to the file format but not combined with any sensor data. Rather, the subportion 86 is compressed and combined with the sensor data and then encrypted. Parameters giving the location of the subportion 86 are incorporated into the header data so that it will be possible to correctly compare the decrypted and decompressed subportion 80 with the appropriate part of the decompressed entire video image 80. The subportion 86 can be placed at any desired location in the entire video image 80. However, if desired, the location of the subportion can be changed randomly (say, to a subportion 86') so that a potential counterfeiter would be unable to know which subportion 86, if any, of the entire image 80 was used to validate the played-back compressed entire video image 80.

Figure 6:
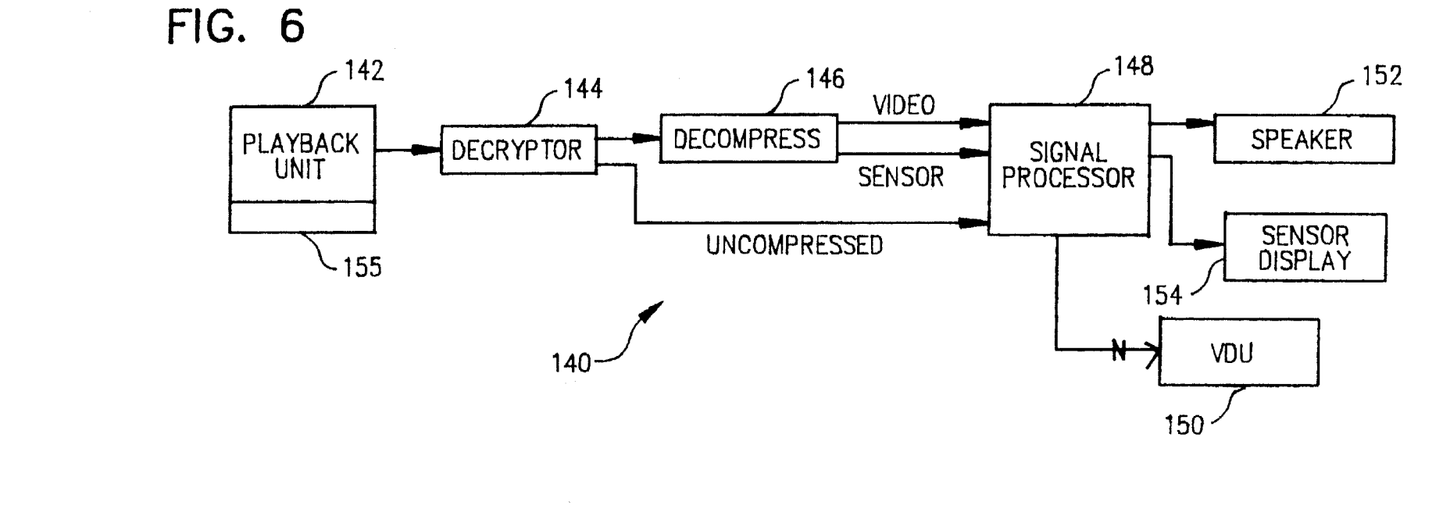
FIG. 6 is a block diagram of an apparatus for playback of the data stored by the data recorder of the present invention.

FIG. 6 is a block diagram of an apparatus for playback of the data stored by the data recorder of the present invention. The playback apparatus 140 includes a playback unit 142, a decryption circuit 144, a decompression circuit 146, a playback signal processing circuit 148, a video display unit (VDU) 150, a speaker 152 and a sensor display 154. The playback unit 142 includes a control panel 155 from which a user of the playback apparatus 140 can control the playback process, including entry of any data needed to facilitate the decryption process, such as entry of the second (unpolished) component of any public key encryption system that may be in use. The playback unit 142 accepts the removable hard disk that was removed from the mass storage device 30, and plays back the removable hard disk to reproduce the digital data stored on the removable hard disk. The signals representing the digital data are transmitted to the decryption circuit 144 which removes the effect of the encryption performed on the data prior to storage on the removable hard disk drive. The decryption circuit 144 produces a compressed signal and an uncompressed signal, including original sensor signals. The compressed signal is received by the decompression circuit 146 which produces a decompressed video signal and a decompressed sensor signal. The uncompressed signal from the decryption circuit 144 and both of the decompressed signals from the decompression circuit 146 are received by the signal processing circuit 148. In response, the signal processing circuit 148 produces an analog video signal and an audio signal. The analog video signal is received by the VDU 150 which causes the VDU 150 to reproduce the original images. Also, the speaker 152 receives the audio signal and reproduces the original audio signals that accompanied the original images. In addition, the sensor display 154 receives the sensor signals and reproduces their original readings.

Figure 7:
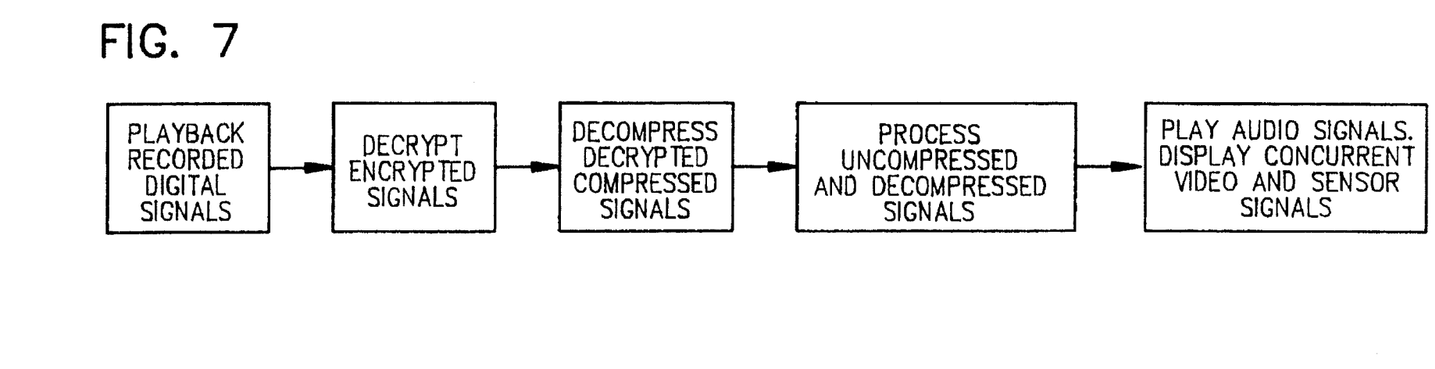
FIG. 7 is a flow chart of the method of playing back the data stored by the data recorder of the present invention.

FIG. 7 is a flow chart of the method of playing back the data stored by the data recorder of the present invention. In this method, the digital signals recorded on the removable hard disk are played back (block 160). Next, the encrypted digital signals among the played-back signals are decrypted (block 162). Any compressed signals included among those that were originally played back or later decrypted are then decompressed (block 164) and the resulting uncompressed and decompressed signals are processed to produce audio signals, video signals and sensor signals that were originally concurrent (block 166). The audio signals are then played, and the concurrent video and sensor signals are displayed (block 168), thereby reproducing the original video, audio and sensor signals. In the case where only a portion of the original video image is encrypted, the signal processing circuit 148 also compares the decompressed decrypted subportion 86 of the entire video image 82 with the proper portion of the decompressed entire video image 82 before displaying the decompressed entire video image 82. If there are discrepancies, the signal processing circuit 148 will alert the user to the type and location of the discrepancies.

The preferred embodiment of the present invention has been described in detail sufficient for one skilled in the electronics and radio frequency arts to understand the invention. Such skilled persons, however, could devise alternative embodiments to that described herein while remaining within the scope of the appended claims. Accordingly, the scope of the invention is to be limited only by the appended claims.

I claim:

1. A method for recording sensor data with a video signal to protect the sensor data, the sensor data being contained in signals from one or more sensors, the method comprising the steps of:

a) encrypting the signals from the one or more sensors;

b) combining the video signal and the encrypted signals to produce an output signal; and c) recording the output signal on a recording medium.

2. The method of claim 1, wherein step a) comprises:

a1) transforming the signals from the one or more sensors to digital signals; and a2) encrypting the digital signals in accordance with a digital encryption procedure.

3. The method of claim 2, wherein step a2) includes encrypting the digital signals in accordance with a public key encryption procedure.

4. The method of claim 1, wherein step b) includes mixing the video signal and the encrypted signal.

5. The method of claim 1, wherein the video signal and the signals containing the sensor data are digital signals, step a) includes encrypting the digital signals in accordance with a digital encryption procedure and step b) includes digitally combining the video signal and the encrypted signals.

6. The method of claim 1, wherein step a) includes encrypting a signal from a clock.

7. A method for retrieving sensor data originally produced by one or more sensors, the sensor data being encrypted with a video signal to produce a recorded signal that protects the sensor data and being contained in signals from one or more sensors, the method comprising the steps of:

a) playing back the recorded signal to produce a played-back signal;

b) decrypting the played-back signal to produce a video signal and one or more sensor signals containing data originally produced by one or more sensors; and c) processing the one or more sensor signals to produce the sensor data.

8. The method of claim 7, wherein at least one of the sensor signals is a digital signal that has been encrypted with a digital encryption procedure.

9. The method of claim 8, wherein the digital encryption procedure is a public key encryption procedure.

10. The method of claim 7, wherein the sensor signals and the video signal are mixed.

11. A method for recording sensor data with a video signal to protect the sensor data, the sensor data being contained in signals from one or more sensors, the method comprising the steps of:

a) compressing the video signal to produce a compressed video signal;

b) combining the compressed video signal and the signals from the one or more sensors to produce a digital signal;

c) encrypting the digital signal to produce an output signal; and d) recording the output signal on a recording medium.

12. The method of claim 11, wherein step a) comprises:

a1) digitizing the video signal to produce digital signals; and a2) compressing the digital signals in accordance with a digital compression procedure.

13. The method of claim 11, wherein step c) comprises:
   c1) encrypting the digital signals in accordance with a digital encryption procedure.

14. The method of claim 13, wherein step c1) includes encrypting the digital signals in accordance with a public key encryption procedure.

15. The method of claim 11, wherein the video signal and the signals containing the sensor data are digital signals, step a) includes compressing the digital signals in accordance with a digital compression procedure, step b) includes digitally combining the video signal and the encrypted signals, and step c) includes encrypting the digital signal in accordance with a digital encryption procedure.

16. Apparatus for recording sensor data with a video signal, the sensor data being contained in signals from one or more sensors, the apparatus comprising:
   an encryption circuit to encrypt the signals from the one or more sensors;
   a signal processing circuit to combine the video signal and the encrypted signals to produce an output signal; and
   a recorder to record the output signal on a recording medium.

17. The apparatus of claim 16, wherein the encryption circuit includes:
   a digitizing circuit to transform the signals from the one or more sensors to digital signals; and
   a digital encryption circuit to encrypt the digital signals in accordance with a digital encryption procedure.

18. The apparatus of claim 17, wherein the digital encryption circuit includes a circuit to encrypt the digital signals in accordance with a public key encryption procedure.

19. The apparatus of claim 17, wherein the digitizing circuit includes:
   an analog-to-digital circuit to digitize analog signals produced by some of the sensors; and
   a combining circuit to combine the digitized analog signals with digital signals produced by the remaining sensors.

20. The apparatus of claim 16, wherein the signal processing circuit includes a circuit to mix the video signal and the encrypted signal.

21. The apparatus of claim 16, wherein the video signal and the signals containing the sensor data are digital signals, the encryption circuit encrypts the digital signals in accordance with a digital encryption procedure and the signal processing circuit digitally combines the video signal and the encrypted signals.

22. Apparatus for recording sensor data with a video signal to protect the sensor data, the sensor data being contained in signals from one or more sensors, the apparatus comprising:
   a compression circuit to compress the video signal;
   a signal processing circuit to combine the compressed video signal and the signals from the one or more sensors and produce a digital signal therefrom;
   an encryption circuit to encrypt the digital signal and produce an output signal therefrom; and
   a recorder to record the output signal on a recording medium.

23. The apparatus of claim 22, wherein the compression circuit includes:
   a digitizer to digitize the video signal to produce video digital signals therefrom; and
   a compression circuit to compress the video digital signals in accordance with a digital compression procedure and produce the compressed video signal.

24. Apparatus for retrieving sensor data originally produced by one or more sensors, the sensor data being encrypted with a video signal to produce a recorded signal that protects the sensor data and being contained in signals from one or more sensors, the apparatus comprising:
   a play-back circuit to play back the recorded signal to produce a played-back signal;
   a decryption circuit to decrypt the played-back signal to produce a video signal and one or more sensor signals containing data originally produced by one or more sensors, wherein at least one of the sensor signals is a digital signal that has been encrypted with a digital encryption procedure;
   a logic circuit to determine whether any of the one or more sensor signals are digital signals; and
   a signal processing circuit to process the one or more sensor signals to produce the sensor data, the signal processing circuit including a decompression circuit to decompress any digital sensor signals.

* * * * *